(12) United States Patent
Wong et al.

(10) Patent No.: US 10,693,213 B2
(45) Date of Patent: Jun. 23, 2020

(54) ANTENNA MODULE AND A WIRELESS DEVICE HAVING THE SAME

(71) Applicant: HON HAI PRECISION INDUSTRY CO., LTD, New Taipei (TW)

(72) Inventors: Kwo-Jyr Wong, New Taipei (TW); Jane-Yi Pieh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 358 days.

(21) Appl. No.: 15/637,001

(22) Filed: Jun. 29, 2017

(65) Prior Publication Data

US 2018/0006359 A1    Jan. 4, 2018

Related U.S. Application Data

(60) Provisional application No. 62/356,834, filed on Jun. 30, 2016.

(51) Int. Cl.
  *H01Q 1/24*   (2006.01)
  *H01Q 1/36*   (2006.01)
  *H01Q 9/04*   (2006.01)

(52) U.S. Cl.
  CPC ............ *H01Q 1/242* (2013.01); *H01Q 1/243* (2013.01); *H01Q 1/36* (2013.01); *H01Q 9/0421* (2013.01); *H01Q 9/0485* (2013.01)

(58) Field of Classification Search
  CPC ............... H01Q 1/24; H01Q 1/36; H01Q 9/04
  USPC ........................................................ 343/785
  See application file for complete search history.

(56) References Cited

U.S. PATENT DOCUMENTS

2011/0291889 A1* 12/2011 Mayo .................. H01Q 1/3216
                                                        342/372

* cited by examiner

*Primary Examiner* — Andrea Lindgren Baltzell
(74) *Attorney, Agent, or Firm* — ScienBiziP, P.C.

(57) ABSTRACT

An antenna module includes a plurality of antenna units, wherein one of the antenna units includes a fixed phase and the other antenna units respectively include a phase adjusted in response to the fixed phase.

26 Claims, 12 Drawing Sheets

ANTENNA MODULE AND A WIRELESS DEVICE HAVING THE SAME

CROSS REFERENCE

This application claims the benefit of U.S. Provisional Application Ser. No. 62/356,834, filed on Jun. 30, 2016, and entitled "UE ANTENNA STRUCTURE, METHOD FOR BEAM SWITCHING AND TRACKING", which is incorporated herein by reference in its entirety.

TECHNICAL FIELD

The present disclosure generally relates to an antenna module, and particularly to an antenna module including phase adjusting capability.

BACKGROUND

In a communication environment, antenna gains at base station (BS) and mobile station (MS) are generally configured respectively at 25 dBi and 12 dBi, which is for 250 meters distance from BS to MS for proper communication.

Shortcomings exist, four primary shortcomings are: (1) finite beam angle available in spatial domain; (2) limited space on top and bottom sides; (3) large number of power amplifiers (PA), low noise amplifiers (LNA) and phase shifters; and (4) high power consumption.

BRIEF DESCRIPTION OF THE DRAWINGS

Aspects of the present disclosure are best understood from the following detailed description when read with the accompanying figures. It is noted that various features are not drawn to scale, the dimensions of various features may be arbitrarily increased or reduced for clarity.

FIG. 7-1 is a schematic view illustrating the antenna gain pattern of the antenna module in azimuth (xz-plane);

FIG. 7-2 is a schematic view illustrating the antenna gain pattern of the antenna module in elevation (xy-plane);

DETAILED DESCRIPTION

Figure 1:
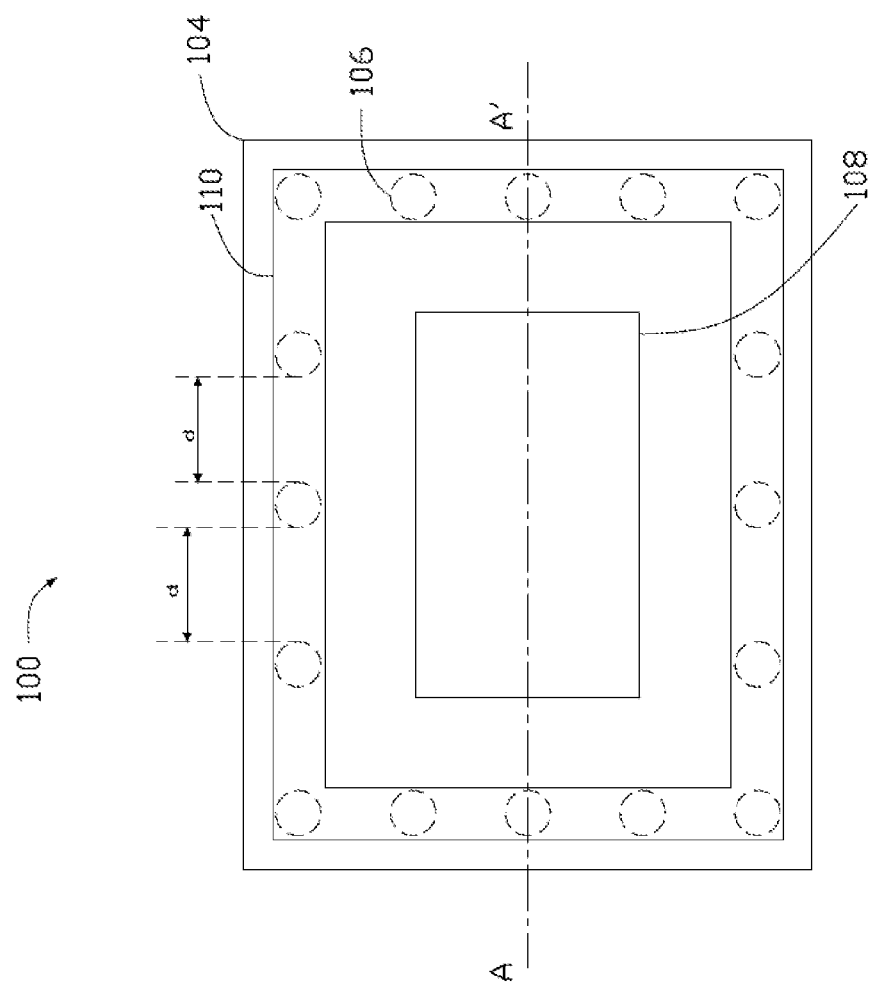
FIG. 1 shows a schematic top view of an antenna unit of one embodiment of the present disclosure.

The following disclosure provides many different embodiments, or examples, for implementing different features of the provided subject matter. Specific examples of components and arrangements are described below to simplify the exemplary disclosure. These are, of course, merely examples and are not intended to be limiting. For example, the formation of a first feature being over or on a second feature in the description that follows may include embodiments in which the first and second features are in direct contact, and may also include embodiments in which additional features may be formed between the first and second features, such that the first and second features may not be in direct contact. In addition, the exemplary disclosure may repeat reference numerals and/or letters in the various examples. Such repetition is for the purpose of simplicity and clarity and does not in itself dictate a relationship between the various embodiments and/or configurations discussed.

Like features are identified (although, in some instances, not shown) by identical or like numerals in the figures. However, the features in different embodiments may differ in other respects, and thus shall not be narrowly confined to what is shown in the figures.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Persons skilled in the art will recognize immediately that, only some exemplary embodiments are described in this specification, and alternative exemplary embodiments are well within the scope of the present disclosure.

Figure 2:
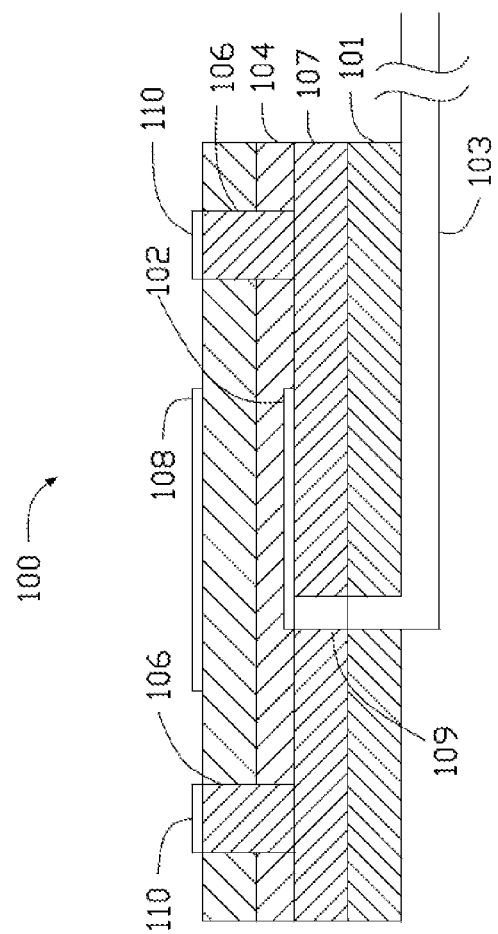
FIG. 2 shows a schematic cross-sectional view of the antenna unit of FIG. 1 alone AA' line.

FIG. 1 shows a schematic top view of an antenna unit 100 of one embodiment of the present disclosure. FIG. 2 shows a schematic cross-sectional view of the antenna unit 100 of FIG. 1 alone AA' line. In some embodiments, the antenna unit 100 includes a dual patch/substrate integrated waveguide (SIW) based antenna unit. In some embodiments, the antenna unit 100 includes an mm wave antenna. In other embodiments, the antenna unit 100 includes a side-face radiation antenna.

As shown in FIG. 1 and FIG. 2, in this embodiment, the antenna unit 100 includes a substrate 101 with a signal transmitting path 103, a first dielectric layer 105 disposed on the substrate 101, a inner layer 107 disposed on the first dielectric layer 105, a signal feeding via 109 coupled between a first patch 102 disposed on the inner layer 107, and the signal transmitting path 103 through the inner layer 107 and the first dielectric layer 105, a second dielectric layer 104 disposed on the first patch 102 and the inner layer 107, and a plurality of vias 106 arranged around a second patch 108, wherein each of the vias 106 coupled between a metal frame, and the first dielectric layer through the second dielectric layer and the inner layer 107. In this embodiment, the vias 106 are disposed with predetermined spacing d, which means the vias 106 are spaced equally. In this embodiments, the second patch 108 disposed on the second dielectric layer 104 in response to the first patch 102.

In some embodiments, the signal transmitting path 103 includes a coaxial cable. In some embodiments, a impedance of the coaxial cable 103 includes 50Ω(Ohm). In some embodiments, the inner layer 107 includes a fabric-type material. In some embodiments, the inner layer 107 includes a pre-preg material.

Figure 3:
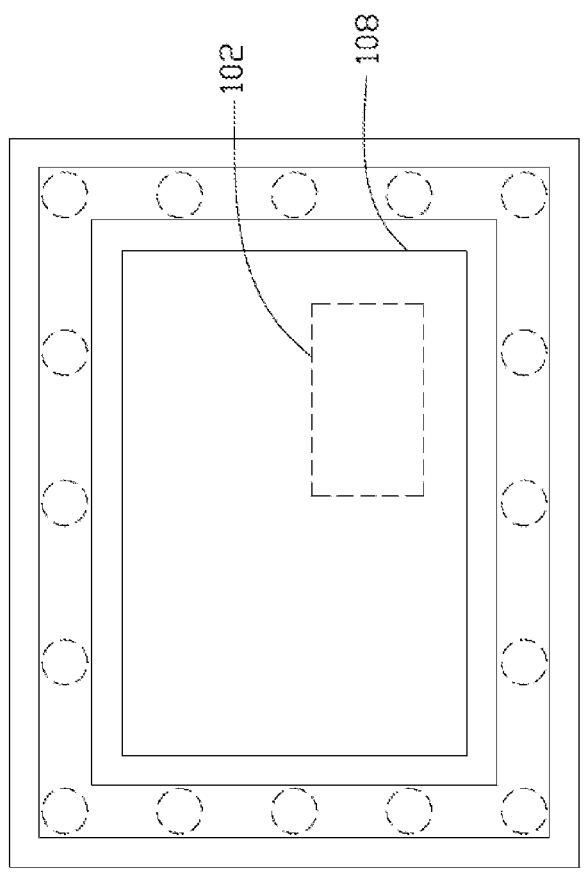
FIG. 3 shows a schematic view of an antenna unit of one embodiment of the present disclosure.
Figure 4:
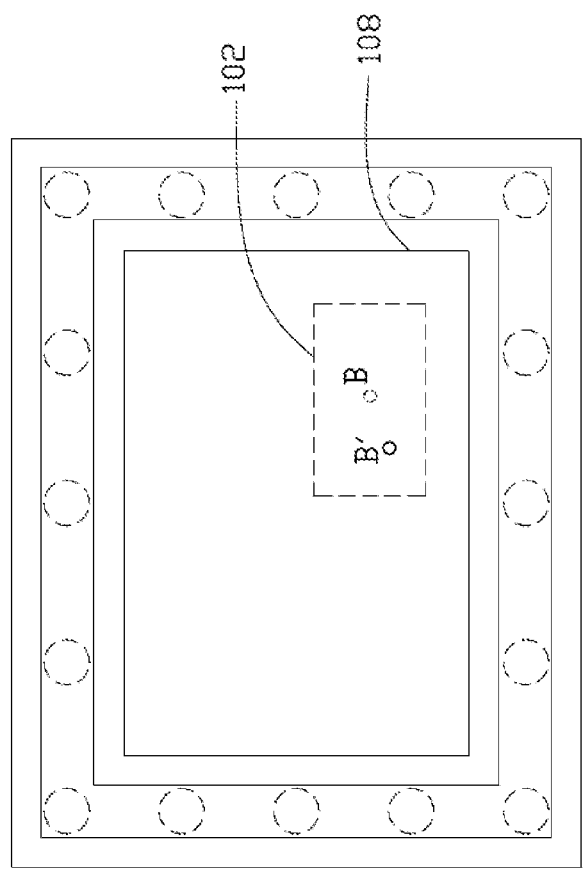
FIG. 4 shows a schematic view of an antenna unit of one embodiment of the present disclosure.

In some embodiments, as shown in FIG. 3, dimensions of the first patch 102 are different from dimensions of the second patch 108. In other embodiments, as shown in FIG. 4, a center point B of the first patch 102 is misaligned to a center point B' of the second patch 108.

Figure 5:
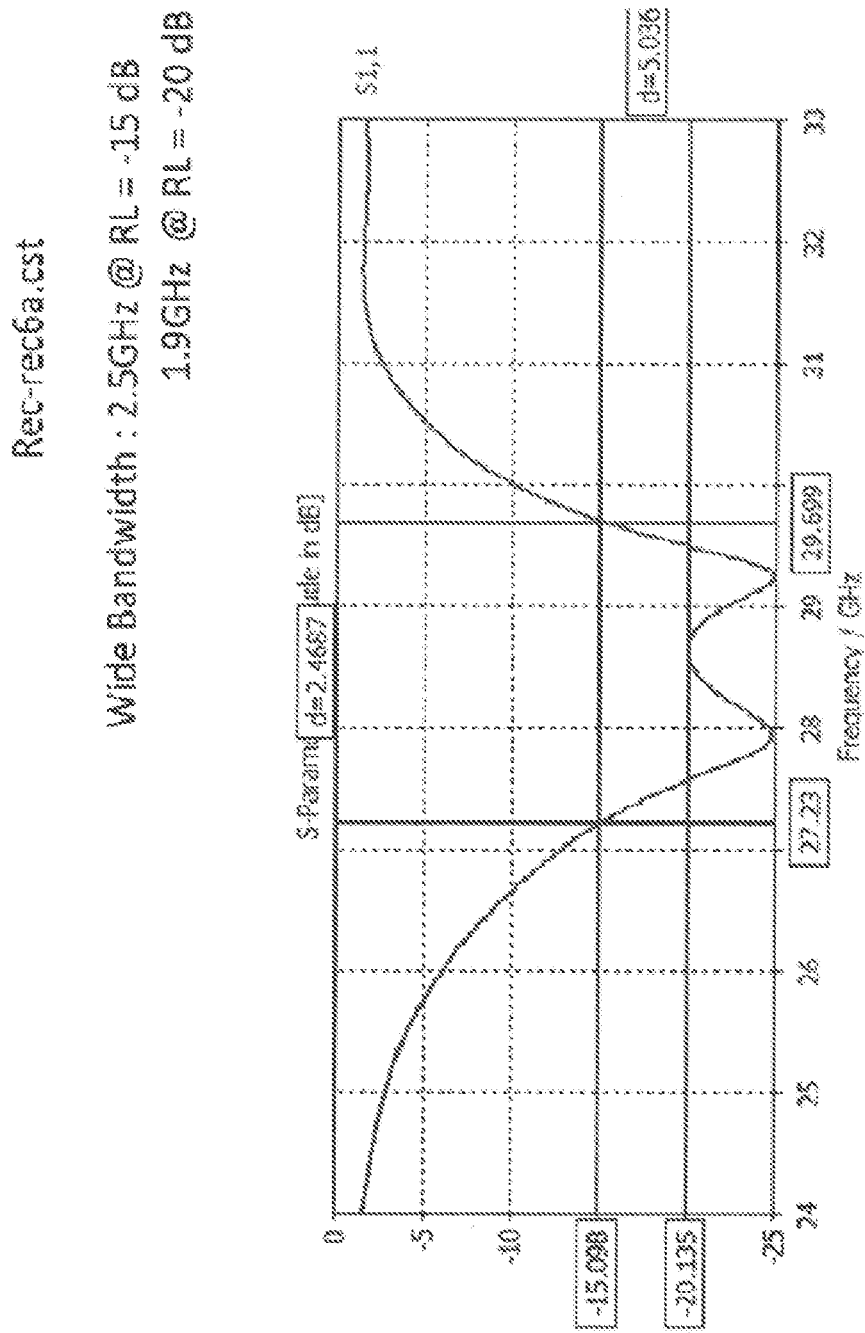
FIG. 5 shows a wideband performance of the antenna unit of FIG. 1 of the present disclosure.

FIG. 5 shows a wideband performance of the antenna unit 100 of FIG. 1 of the present disclosure. As shown in FIG. 5, the antenna unit 100 includes a bandwidth approximately a 2.5 GHz bandwidth (from 27.33 GHz to 29.699 GHz). As shown in FIG. 5, a return loss (RL) at 2.5 GHz and 1.9 GHz is respectively −15 dB and −20 dB.

Figure 6:
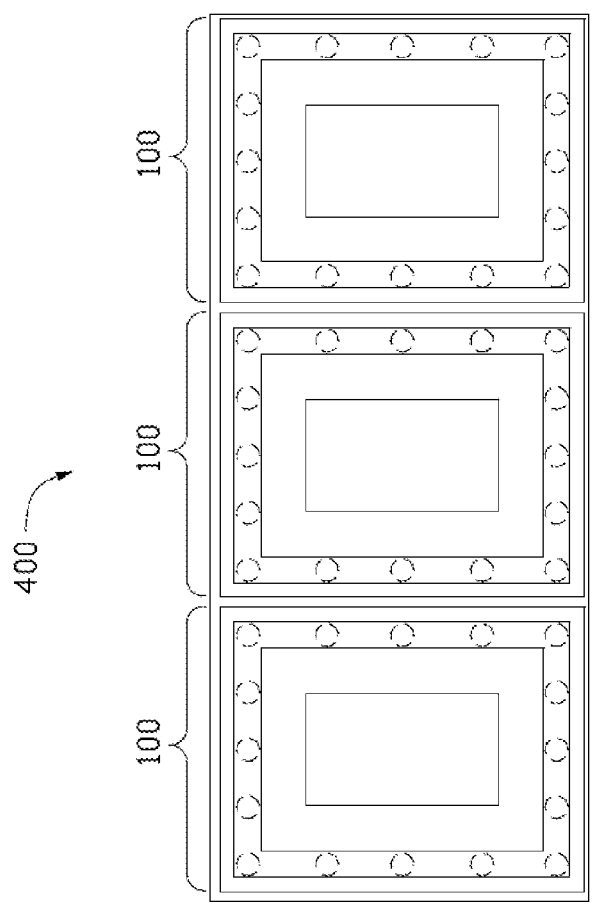
FIG. 6 shows an antenna module of one embodiment of present disclosure.

FIG. 6 shows an antenna module 400 of one embodiment of present disclosure. The antenna module 400 includes a plurality of antenna units 100, wherein one of the antenna unit 100 includes a fixed phase and the other antenna units 100 are configured to respectively include a phase adjusted in response to the fixed phase.

As shown in FIG. 6, in this embodiment, the antenna module 400 includes three antenna units 100 to form a 3×1 array. In some embodiments, the dimensions of the antenna module 400 are 24 mm×8 mm×3 mm. Moreover, the antenna module 400 should not be limited to a 3×1 array, any person with ordinary skill in the art can adjust the arrangement of the antenna units 100 (such as 4×1 for higher antenna gain) to fit different requirements, e.g. operating and capacity, of the UE.

Figure 7:
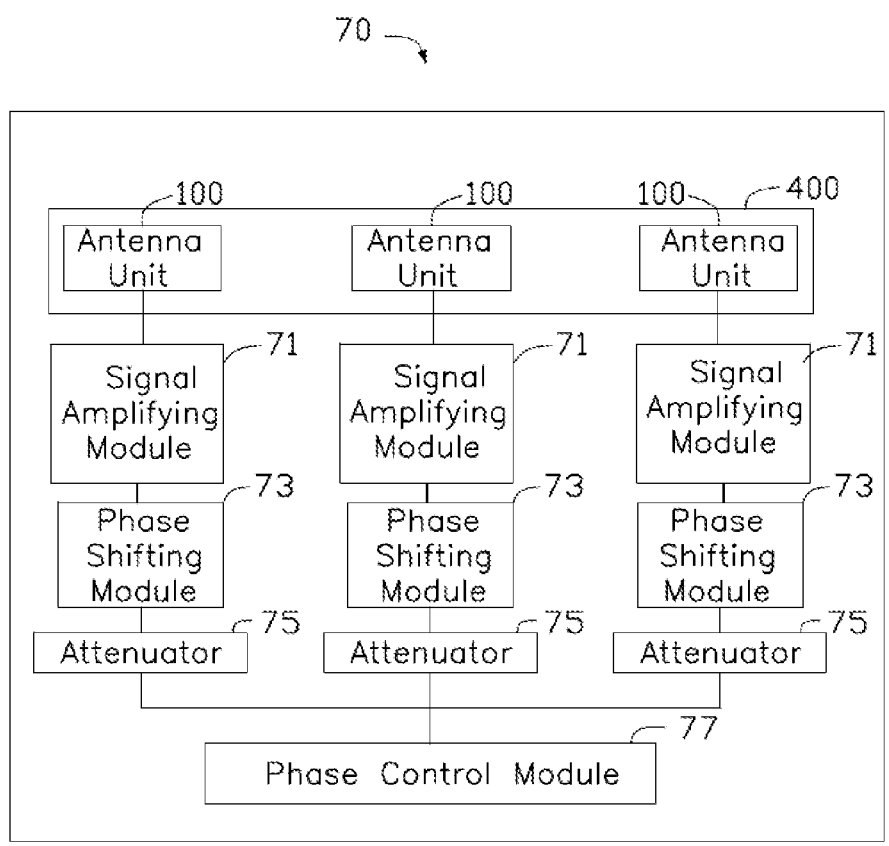
FIG. 7 shows a schematic view of function blocks of a wireless device of one embodiment of the present disclosure.
Figures 1, 7:
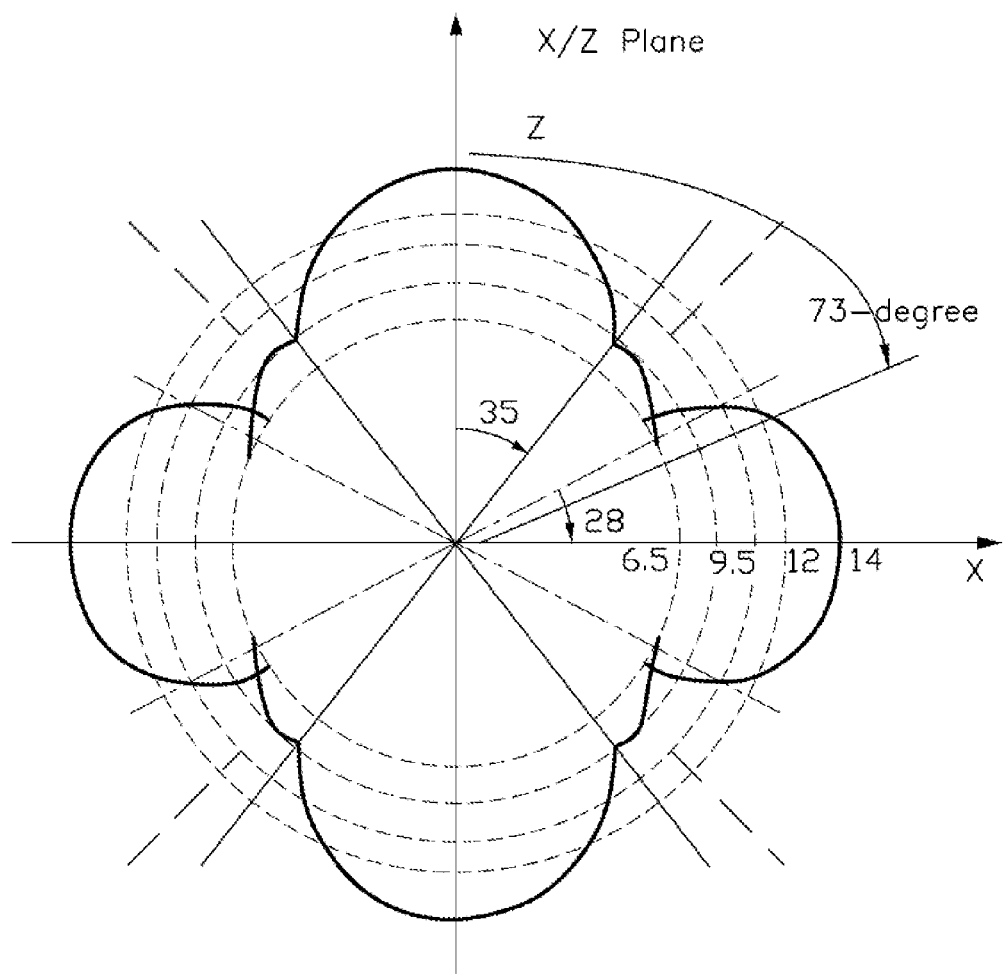
Figures 2, 7:
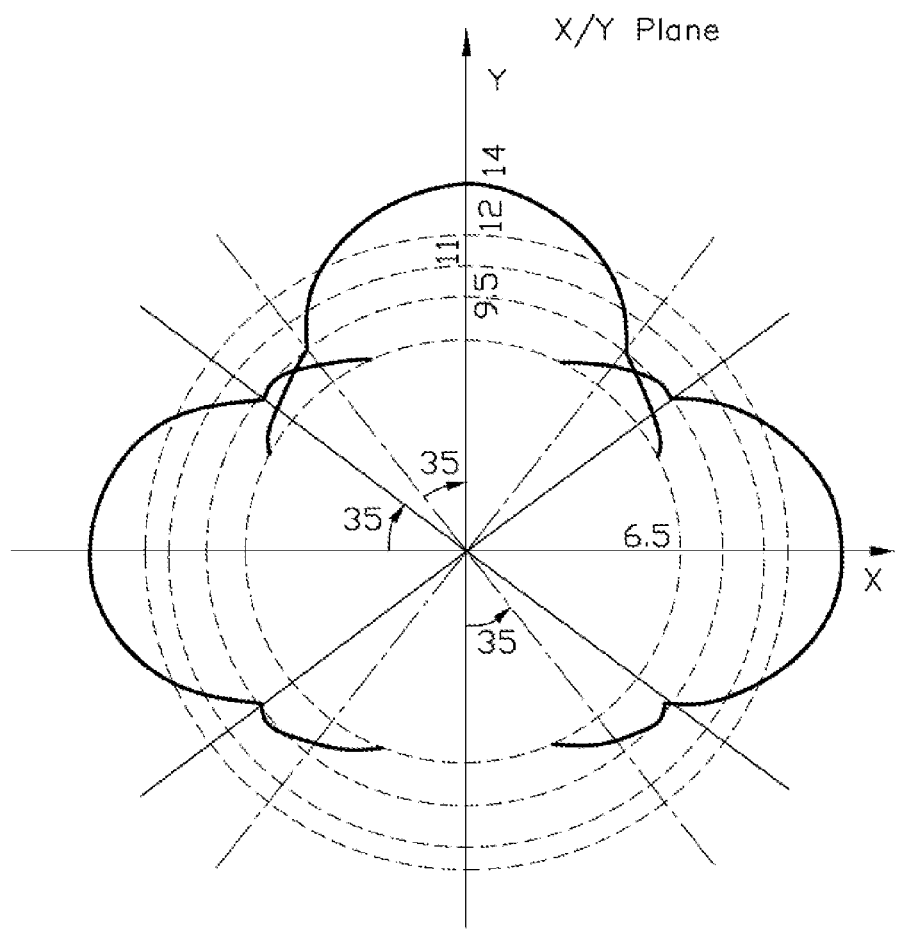

FIG. 7 shows a schematic view of function blocks of a wireless device 70 of one embodiment of the present disclosure. As shown in FIG. 7, in this embodiment, the wireless device 70 includes the antenna module 400, wherein the antenna module 400 includes the antenna units 100. As shown in FIG. 7, a plurality of signal amplifying modules 71 are respectively coupled between the antenna units 100 and a plurality of phase shifting modules 73, wherein the signal amplifying module 71 is configured to amplify a plurality of signals transceived by the antenna units 100.

Moreover, in this embodiment, one of the phase shifting modules 73 includes a fixed phase value, and the other phase shifting modules 73 are configured to respectively shift phase in response to the fixed phase value and a phase shift control signal, generated by a phase control module 77. In this embodiment, the fixed phase value includes 360 degree and a phase value of the other phase shifting modules 73 includes 0 to 360 degree. In some embodiments, a phase value of the other phase shifting modules 73 includes 0 to −360 degree.

As shown in FIG. 7, in this embodiment, the wireless device 70 further includes a plurality of attenuators 75 respectively coupled between the phase shifting modules 73 and the phase control module 77. In this embodiment, the attenuators 75 are configured to compensate path loss errors. In some embodiments, the attenuators 75 are configured to compensate taper tuning.

FIG. 7-1 illustrates the antenna gain pattern of the antenna module 400 in azimuth (xz-plane). In FIG. 7-1, the azimuth angle is determined as if the UE is being held vertically. Thereby, the highest horizontal gain is 14 dBi as shown in FIG. 7-1. The circle radius antenna gain is 6.5, 9.5, 11, and 12 dBi from inner to outer.

On the X-axis, the 3 dB beam width is 54.6-degrees, such that around +/−28 degree, the gain drops to 11-dBi. On the Z-axis, the phase shifter at maximum (set here as +/−360-degrees), the antenna gain drops to 9.5 dBi at spatial angle of +/−35 degrees. At this boundary, the 3 dB gain band width is 77 degrees in azimuth, which means the gain drops from 9.5 dBi to 6.5 dBi and has an angle of 38 degrees (the largest angle is 35+38=73 degrees at 6.5 dBi). The minimum gain in azimuth is therefore more than 7 dBi.

FIG. 7-2 is a schematic view illustrating the antenna gain pattern of the antenna module 400 in elevation (xy-plane). As shown in FIG. 7-2, in the X/Y plane of up-hemisphere area, the highest gain is 14 dBi, the minimum gain is over 7 dBi. Moreover, the antenna gain circle radius, from inner to outer is 6.5, 9.5, 11, and 12 dBi.

Figure 8:
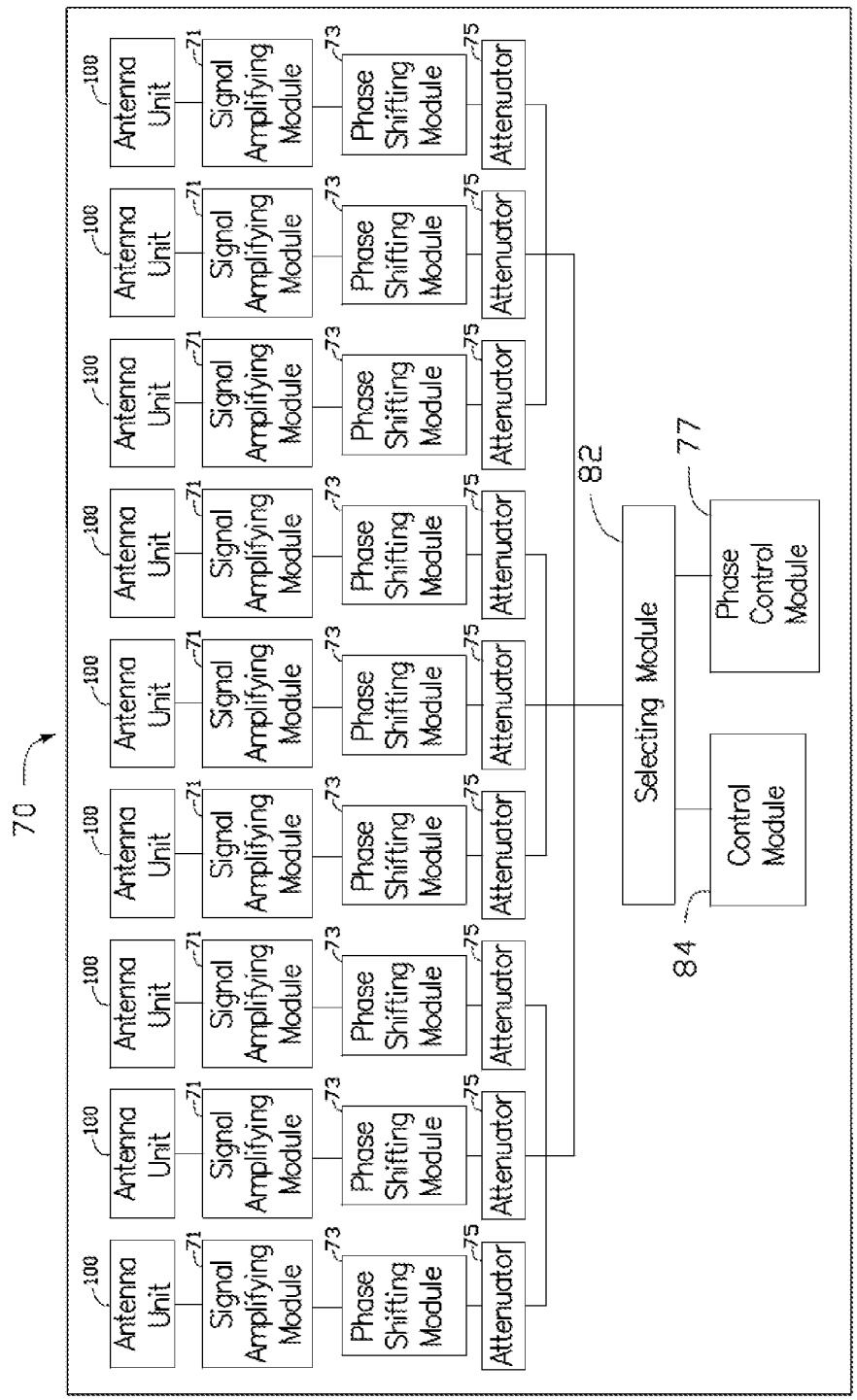
FIG. 8 shows a schematic view of function blocks of a wireless device of one embodiment of the present disclosure.

FIG. 8 shows a schematic view of function blocks of a wireless device 70' of one embodiment of the present disclosure. In this embodiment, the wireless device 70' includes a user equipment (UE). As shown in FIG. 8, in this embodiment, the wireless device 70' is similar to the wireless device 70 of FIG. 7 but includes a plurality of antenna modules 400, a selecting module 82 and a control module 84. As shown in FIG. 8, the selecting module 82 is configured to select and active, in response to a selecting signal generated by the control module 84, at least one antenna module 400 for transceiving a plurality of wireless signals.

Figure 9:
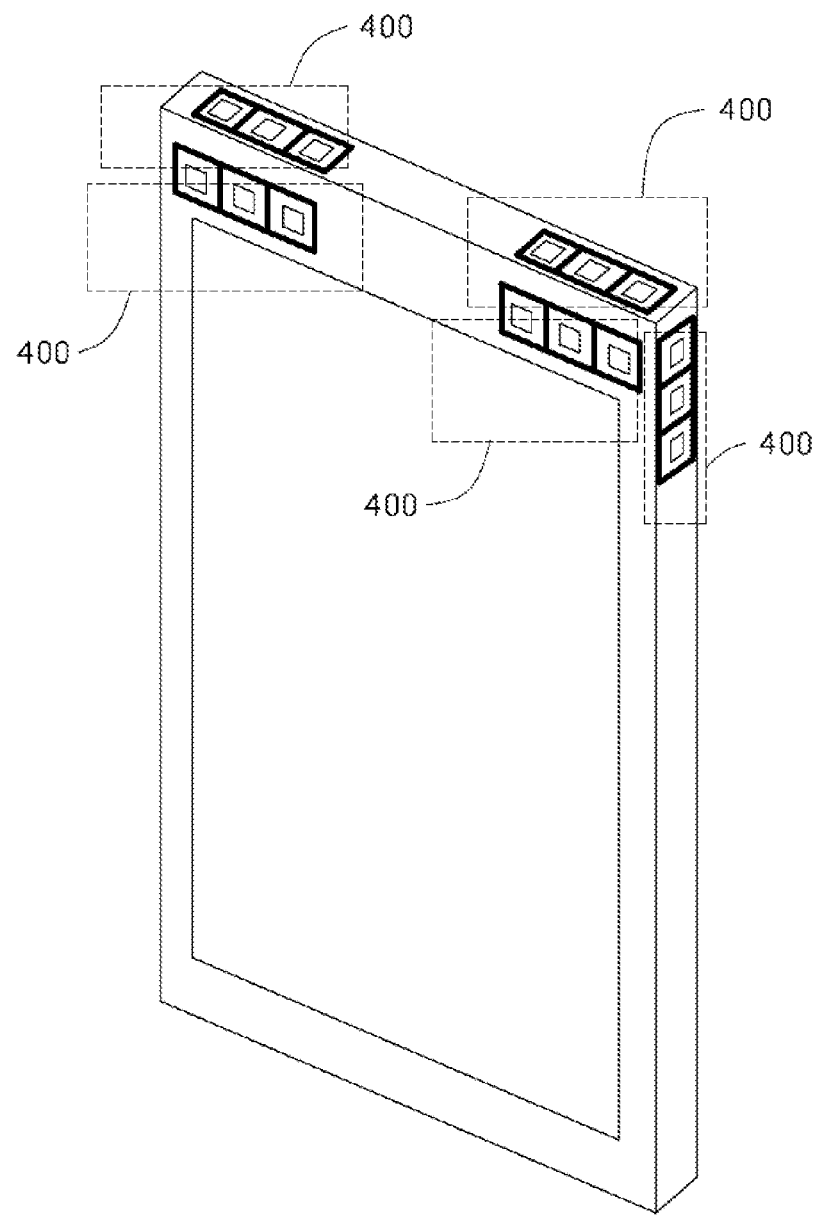
FIG. 9 shows a schematic view of the wireless device of FIG. 8 of one embodiment of the present disclosure.

FIG. 9 shows a schematic view of the wireless device 70' of FIG. 8 of one embodiment of the present disclosure. As shown in FIG. 9, the wireless devise 70' includes a plurality of antenna modules 400 on top portion of side-face of the wireless device 70'. In this embodiment, the antenna modules 400 are respectively facing 6 directions. As shown in FIG. 9, the antenna module 400 of left side is not shown and the antenna modules 400 of back side are not shown. Therefore, in this embodiment, the wireless device 70' includes a 360 degree coverage on each direction on top portion of the wireless device 70'.

In this embodiment, the antenna modules 400 are activated for detecting a beam of each of the antenna modules 400 in response to an activating signal generated by a control module. In some embodiments, the antenna modules 400 are activated sequentially. In some embodiments, the antenna modules are activated at the same time. In this embodiments, a beam is then selected from the detected beams in response to a selecting signal, generated by the control module, from a selecting module. In this embodiment, a plurality of wireless signals is transceived on the selected beam.

Figure 10:
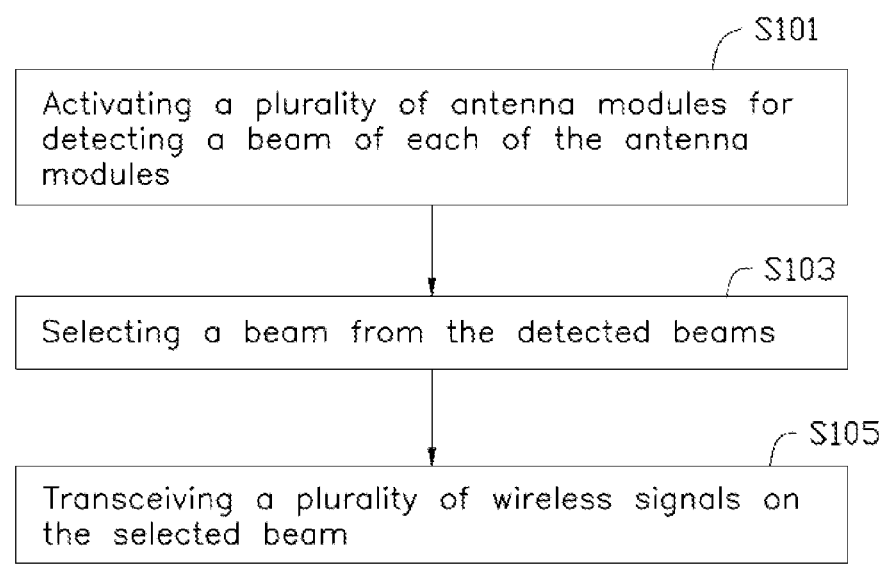
FIG. 10 shows a flow chart of a method of beam selecting implemented on a wireless device of one embodiment of the present disclosure.

FIG. 10 shows a flow chart of a method of beam selecting implemented on a wireless device of one embodiment of the present disclosure. As shown in FIG. 10, in step S101, a plurality of antenna modules is activated for detecting a beam of each of the antenna modules. In step S103, a beam is selected from the detected beams. In step S105, a plurality of wireless signals is transceived on the selected beam.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the board general meaning of the terms used in the claims. It will therefore be appreciated that the embodiments described above may be modified within the scope of the claim.

What is claimed is:

1. A wireless device, comprising:
   a plurality of antenna modules, wherein each of the antenna modules includes a plurality of antenna units, wherein one of the antenna unit of the antenna module includes a fixed phase and the other antenna units of the antenna module respectively include a phase adjusted in response to the fixed phase, wherein the antenna unit includes:
a substrate including a signal transmitting path;
a first dielectric layer disposed on the substrate;
an inner layer disposed on the first dielectric layer;
a signal feeding via coupled between a first patch and the signal transmitting path through the inner layer and the first dielectric layer;
a second dielectric layer disposed on the first patch and the inner layer; and
a plurality of vias arranged around a second patch, wherein each of the vias is coupled between a metal frame and the first dielectric layer through the second dielectric layer and the inner layer, respectively; and
wherein the second patch is disposed on the second dielectric layer corresponding to the first patch.

2. The wireless device of claim 1 further including a plurality of phase shifting modules respectively coupled between a phase control module and the antenna units.

3. The wireless device of claim 2, wherein one of the phase shifting modules includes a fixed phase value, and the other phase shifting modules are configured to respectively shift phase in response to the fixed phase value and a phase shift control signal, generated by a phase control module.

4. The wireless device of claim 2 further including a plurality of signal amplifying modules respectively coupled between the antenna units and the phase shifting modules, wherein the signal amplifying module is configured to amplify a plurality of signals transceived by the antenna units.

5. The wireless device of claim 2 further including a plurality of attenuators respectively coupled to the phase shifting modules.

6. The wireless device of claim 5, wherein the attenuator is configured to compensate path loss errors.

7. The wireless device of claim 5, wherein the attenuator is configured to compensate taper tuning.

8. The wireless device of claim 1, wherein the fixed phase value includes 360 degree.

9. The wireless device of claim 1, wherein a phase value of the other antenna units includes 0 to 360 degree.

10. The wireless device of claim 1, wherein a phase value of the other antenna units includes 0 to −360 degree.

11. The wireless device of claim 1, wherein the antenna module includes a plurality of side-face radiation antennas.

12. The wireless device of claim 1, wherein the antenna unit further includes a dual patch/substrate integrated waveguide (SIW) based antenna.

13. The wireless device of claim 1, wherein the signal transmitting path includes a coaxial cable.

14. The wireless device of claim 1, wherein the inner layer includes a fabric-type material.

15. The wireless device of claim 1, wherein the inner layer includes a pre-preg material.

16. The wireless device of claim 1, wherein the vias are disposed with predetermined spacing.

17. The wireless device of claim 16, wherein the vias are spaced equally.

18. The wireless device of claim 1, wherein dimensions of the first patch are different from dimensions of the second patch.

19. The wireless device of claim 13, wherein an impedance of the coaxial cable includes 50Ω(Ohm).

20. The wireless device of claim 1, wherein the antenna unit further includes an mm wave antenna.

21. The wireless device of claim 1, wherein a center point of the first patch is misaligned to a center point of the second patch.

22. The wireless device of claim 1 further including a selecting module coupled to the antenna modules, wherein the selecting module is configured to select and active, in response to a selecting signal generated by a control module coupled to the selecting module, at least one antenna module to transceive a plurality of wireless signals.

23. The wireless device of claim 22, wherein the selecting signal is generated in response to instantaneous movements of the wireless device.

24. The wireless device of claim 22, wherein the wireless device includes a user equipment.

25. The wireless device of claim 22, wherein the selecting module includes a switch.

26. The wireless device of claim 1 further including an antenna array.

* * * * *